Oct. 13, 1936.  A. T. SHERE  2,057,211
TRACTOR
Filed Oct. 9, 1933  2 Sheets-Sheet 1
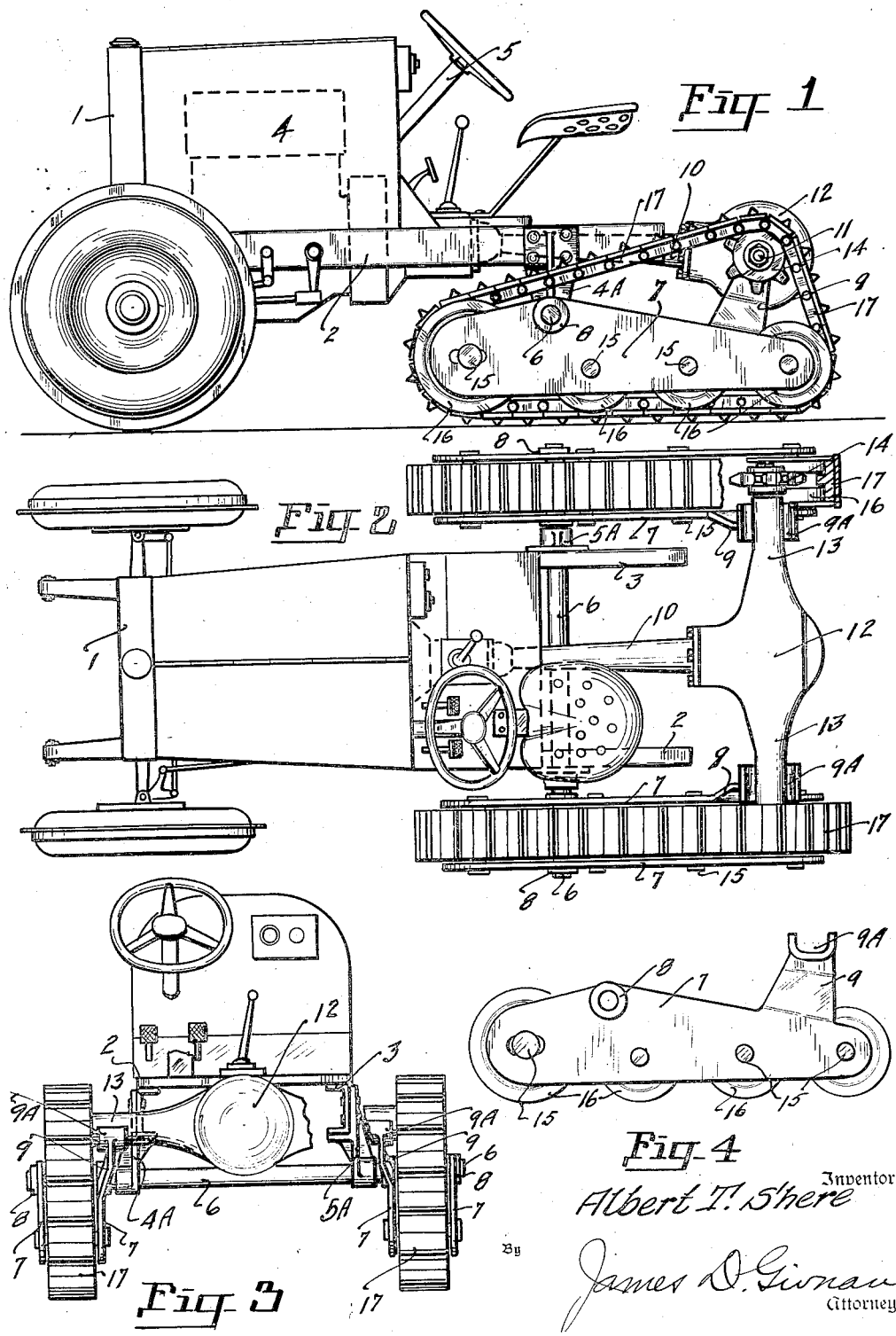

Oct. 13, 1936.  A. T. SHERE  2,057,211
TRACTOR
Filed Oct. 9, 1933  2 Sheets-Sheet 2

Inventor
Albert T. Shere
By James D. Girnan
Attorney

Patented Oct. 13, 1936

2,057,211

UNITED STATES PATENT OFFICE 2,057,211

TRACTOR

Albert T. Shere, Vancouver, Wash.

Application October 9, 1933, Serial No. 692,757

3 Claims. (Cl. 180—9.1)

This invention relates to improvements in tractors and more especially to the track-laying type, and has for its principal object to provide a structure which will facilitate the conversion, at a minimum cost, of an automobile into a practical crawler type tractor, or into a semi-crawler type tractor, having a minimum wheel base and consequently a minimum turning radius.

Another object of the invention is to provide a tractor of this character wherein the traction units will be in floating relation with respect to the chassis of the tractor.

These and other objects will appear as my invention is more fully hereinafter described in the following specification, illustrated in the accompanying drawings and finally pointed out in the appended claims:

In the drawings:

Figure 1 is a side elevation of my new and improved form of tractor.

Figure 2 is a top plan view of Figure 1 with parts broken away for convenience of illustration.

Figure 3 is a rear elevation of Figure 1.

Figure 4 is a detailed view of the tractor wheel support unit, in side elevation.

Figure 5:
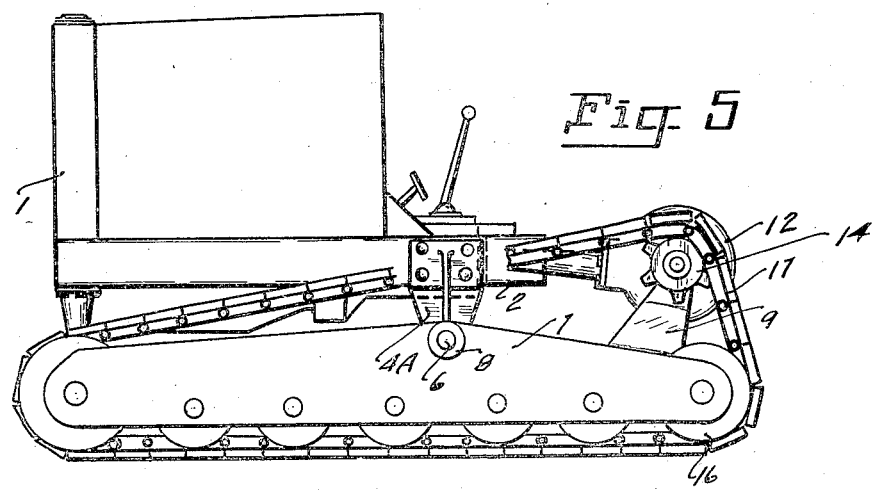
Figure 5 is a side elevation of a modified form of tractor.

Referring now more particularly to the drawings:

Reference numeral 1 indicates, generally, a power driven chassis which may be either what is commonly known as a tractor chassis or an automobile chassis, with which my new and improved form of tractor mechanism is co-operatively engaged. It is understood that the invention is readily adaptable to either form of chassis and I therefore do not wish to be limited to any particular form of chassis.

The chassis comprises a pair of longitudinal frame members indicated at 2 and 3. The frame supports an engine 4, steering mechanism 5, all of the conventional type. Secured to the frame members 2 and 3 and depending downwardly therefrom are a pair of bearing hangers 4A and 5A. A shaft 6 is carried by the bearing hangers, and upon this shaft my tractor wheel supporting element 7 is rockably mounted by means of journal bearings 8. Near the rear end of the wheel supporting element, and extending upwardly therefrom, are a pair of brackets 9, bifurcated as at 9A at their uppermost ends.

In operative engagement with the engine 4, through the customary clutch and transmission, 5 is a drive shaft 10 extending rearwardly from the engine and operatively engaged with a differential and rear axle, both encased within the usual differential and axle housing, indicated at 12 and 13. The axle housing, as shown, is freely supported upon the upper end of the bracket 9.

The outermost ends of the axles are provided with sprocket wheels 14. Within each of the tractor wheel supporting elements 7, I rotatably mount by means of axles 15, a plurality of tractor 15 wheels 16. Around these wheels and around said sprocket I train a tractor chain 17, so that power applied to the rear axle will be transmitted to the tractor wheels to thereby cause forward or rearward movement of the vehicle.

In normal operation of the tractor any flexing of the springs of the vehicle or movement of the wheel supporting elements will be accommodated by the pivotal support 8, and by the loose engagement of the brackets 9 with the axle housing 13. By this arrangement it is plain to see that the wheel carrying element, tractor chains and all of their related parts, can freely move over the irregularities in the ground over which they travel.

Figure 6:
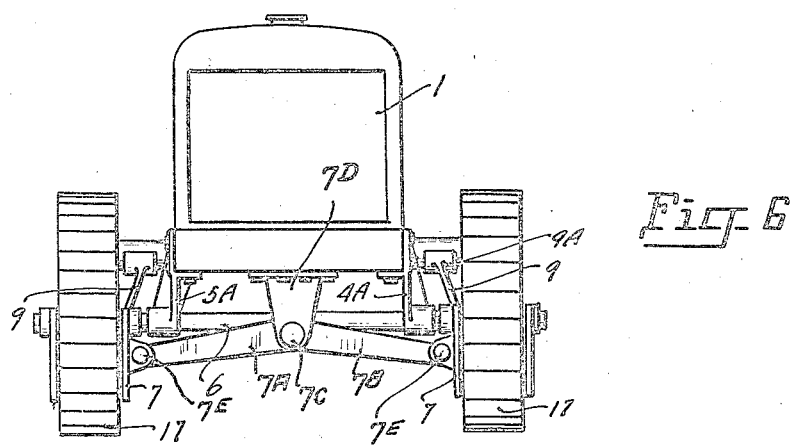
Figure 6 is a front elevation of Figure 5.

The modified form of the invention illustrated in Figure 5 shows the tractor wheel supporting elements extending full length of the tractor and independently pivotally connected to the forward end thereof, as shown in Figure 6, by independent arms 7A and 7B pivotally connected at their inner ends as indicated at 7C to a bracket 7D secured to the underside of the tractor chassis and extending downwardly therefrom. The opposite ends of the arms are pivotally connected to the wheel supporting elements as at 7E.

Figure 7:
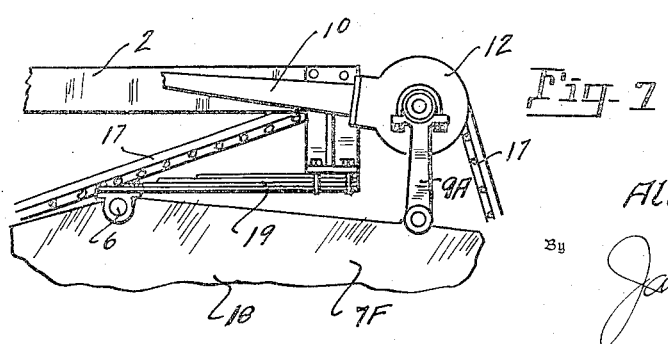
Figure 7 is a fragmentary side elevation of a modified form of connection between the frame and the tractor wheel support unit, wherein the frame is yieldingly mounted upon the tractor wheel support unit.

In Figure 7, I have shown the frame member 2, yieldingly interconnected with the wheel support elements 7F by means of a flat leaf spring 19 pivotally secured as shown, at its outermost end to the wheel supporting elements. Each of the frame members 2 and 3 are connected as shown in Figure 7 and since the springs and their related parts are identical, a description of one will suffice for both.

In all cases where these flat interconnecting springs are used, the upper ends of the brackets 9A (see Figure 7) are shackled to the axle housing 13, and their lowermost ends are pivotally connected to the wheel carrying elements 7.

While I have shown a particular form of improvements by my invention, I am aware that many minor changes therein will readily suggest themselves to others skilled in the art, without departing from the spirit and scope of the invention.

Having thus described my invention, what I claim is new and desire to protect is:

1. In a vehicle of the class described, the combination of a main frame having an engine mounted thereupon, a driving axle transversely mounted with respect to the said frame and positioned beyond one end thereof and operatively connected with said engine, a pair of parallel track frames disposed below said main frame and swingably attached to said frame, said track frames supporting the weight of the rear end of said main frame and also supporting said driving axle, whereby the driving axle is free to move with the truck frames during swinging movement thereof, a plurality of track engaging wheels rotatably mounted within each of said track frames, a sprocket wheel secured to the outermost ends of said driving axle, and an endless track operatively embracing said sprocket and said track engaging wheels.

2. In a vehicle of the class described, the combination of a main frame supported at its forward end by steering wheels, an engine mounted upon said main frame, a drive shaft extending rearwardly from said engine and operatively engaged with a transverse driving axle, a pair of track frames disposed below the rear end of said main frame, a multiplicity of track engaging wheels rotatably mounted on each of said track frames, means for supporting the rearward end of said main frame on said track frames, said means being pivotal to enable said track frames to swing independently in vertical planes parallel to the longitudinal axis of the main frame, means positioned rearwardly of aforesaid supporting means and carried by the track frames for supporting said driving axle on said track frames, a sprocket wheel secured to each end of said driving axle, a pair of endless tracks, each of said tracks operatively embracing one of said sprocket wheels and the track engaging wheels of one of said track frames.

3. In a vehicle having a main frame, an engine mounted thereupon, a front and rear axle, and steering wheels mounted on the front axle, the combination of a tractor unit consisting of independent parallel frames pivotally connected near their forward ends to the said main frame for movement independent of each other, means formed near the opposite end of said track frames for supporting said rear axle, and power transmission means operatively interconnecting said rear axle and said tractor unit.

ALBERT T. SHERE.